July 6, 1943.  H. O. DANZ  2,323,708
TUBE TYPE COLLECTOR
Original Filed June 21, 1940   2 Sheets-Sheet 1

INVENTOR
HARRY O. DANZ,
BY
Toulmin & Toulmin
Attorneys

Inventor
HARRY O. DANZ,

Patented July 6, 1943

2,323,708

UNITED STATES PATENT OFFICE 2,323,708

TUBE TYPE COLLECTOR

Harry O. Danz, Detroit, Mich., assignor to American Blower Corporation, Detroit, Mich., a corporation of Delaware Original application June 21, 1940, Serial No. 341,682. Divided and this application March 20, 1942, Serial No. 435,495

2 Claims. (Cl. 183—80)

My invention relates to dust collectors.

It is the object of my invention to separate and collect dust from air or gas.

An object of the invention is to provide a reverse flow type of multiple tube dust collector of an improved type that is constructed and arranged in a manner that each tube can work at maximum efficiency.

Another object of the invention is to provide a reverse flow type of multiple tube dust collector that is constructed and arranged in a manner to prevent dust streams emerging from the tubes of the collector from flow interference of one another.

Another object of the invention is to provide a multiple tube dust collector of the reverse flow type having baffle means in the tubes to aid formation of a vortex.

While the dimensions are interconnected, or inter-related, and their relative nature is indicated herein, yet it should be understood that it is desirable to vary certain of these proportions within the limits given.

Secondary collectors can be applied to either of the constructions shown by providing connections to the same from any desired point of the dust outlet chambers. A secondary collector is particularly useful for such purposes as remote dust disposal and the like.

This application is a division of my copending application Serial No. 341,682, filed June 21, 1940.

Referring to the drawings:

Figure 3 is a cross sectional view of a portion of the inlet tube of the dust collector showing the use of a baffle in the discharge end thereof.

Figure 4 is a cross sectional view of a portion of the inlet tube of the dust collector showing the use of a cone on the end of the inlet tube.

Figure 1:
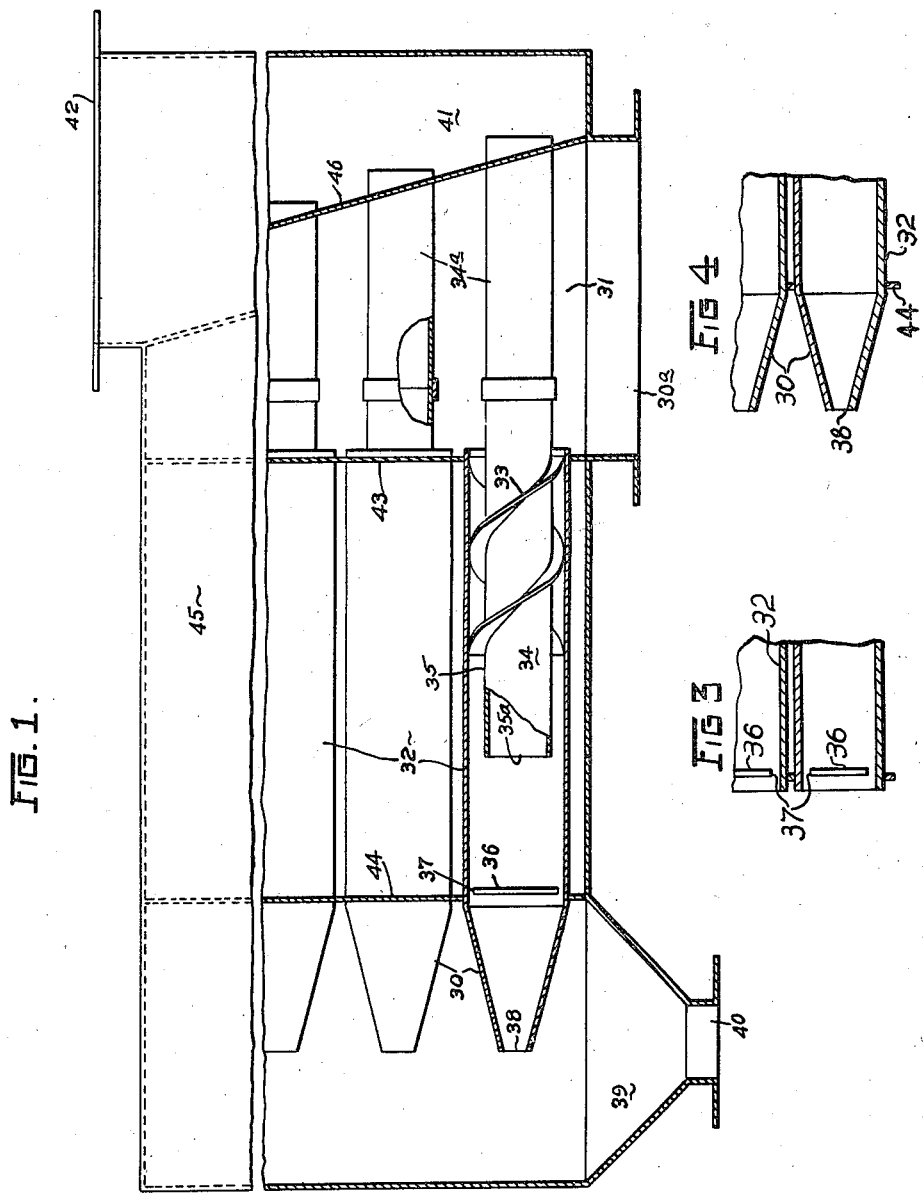
Figure 1 is a side elevational view of the apparatus of this invention partially in cross-section, showing a primary unit arranged with the main tubes in a horizontal position.

Referring to the drawings in detail, and particularly to Figure 1, 30a designates an inlet opening for dust-laden air or gas. The air or gas, with the entrained dust, enters the chamber 31 for admission into the tubes 32 and thus is divided into independent air streams for passage through the dust separating or collecting apparatus. A clean air discharge tube 34 is disposed within the inlet tube 32 and has a helix 33 positioned thereon. The helix 33 imparts a helical motion to the dust laden air passing between the inlet tube 32 and the discharge tube 34, so that the dust is thrown outwardly into engagement with the inside of the tube 32. The helix 33 maintains the discharge tube 34 in spaced parallel relationship to the inside of the tube 32. The length of the helix 33 is given a predetermined pitch proportioned to the inside diameter of the tube 33 to obtain maximum efficiency of dust separation. The discharge tube 34, or separator member, extends a distance beyond the inner end of the helix 33. This portion of the clean air discharge tube, or separator tube, is designated 35.

If the tube 32 were extended a sufficient distance beyond the opening 35a of the outlet tube 34, a vortex would form naturally. The dust separated from the gas or air within the tube 32 by the action of the helix 33 would be discharged from the open end of the straight tube 32 and the central portion of the vortex, which contains clean gas or air, would pass upwardly through the opening 35a and through the discharge tube 34.

Spaced from the lefthand end of the tube 34 there is provided a plate 36 which may be, optionally, a conical deflector. The periphery of the plate 36 is spaced inwardly from the inside of the tube 32, leaving a clearance.

An element 30 extends from the discharge end of the tube 32 and enters a dust collecting chamber 39. This element 30 is provided with an outlet opening 38 through which the dust is discharged into the chamber 39. The chamber or hopper 39 receives the material discharged from the tube 32, which material passes out through the opening 40 into a receptacle or into a secondary collector. The dust free air from the vortex within the tube 32 reverses its axial direction and enters the open end 35a of the tube 34. This dust free air is discharged into the chamber 41 and passes outwardly through the opening 42.

A baffle plate 36 and a cone 30 have both been described as elements of the dust separating apparatus as though they were used in combination. However, if the cone 30 is used the baffle or deflector plate 36 is not absolutely necessary. The reverse is also true, that if the deflector plate is used it is not necessary that the cone be used in cooperation therewith.

In order to decrease the length of the tube 32 either the baffle 36 or the cone 30 can be used, and either means hastens the formation of the vortex.

One of the advantages of the reverse flow type of dust collector or separator is the elimination of the necessity of a secondary collector with the consequent savings in cost, space and the like. While a secondary collector can be used with the reverse flow type of dust collector, and it has advantages under certain circumstances, yet generally speaking it is not necessary.

It will be noted that the tubes 32 are mounted at the righthand end in the inlet tube sheet 43 and supported at the lefthand end by the sheet 44. The separator tube 34 when extended at 34a becomes an outlet tube for dust free air or gas.

The tubes 32 are mounted within the usual casing 45 across which are arranged the plates or partitions 43 and 44. The partition 46 separates the inlet compartment 41 from the outlet compartment 41, and can be arranged angular as shown.

Figure 2:
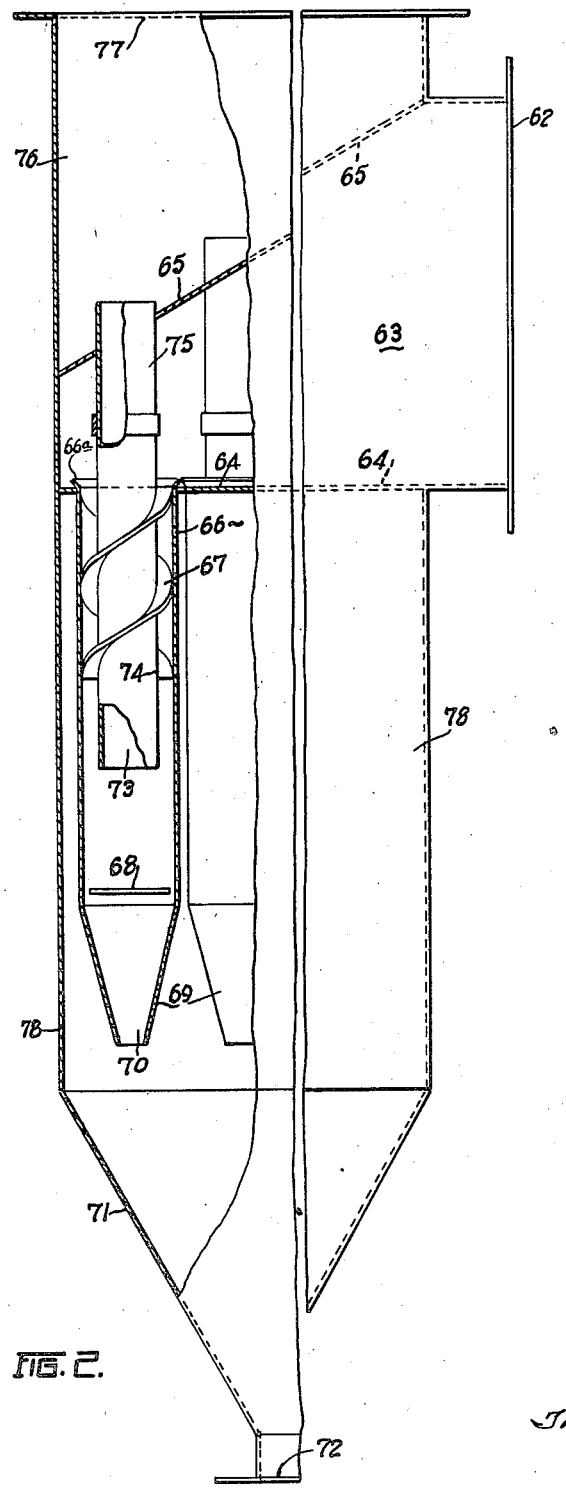
Figure 2 is a side elevational view of a modified form of the apparatus partially in cross-section, showing a primary unit arranged with the main tubes in a vertical position.

Referring to Figure 2, the dust laden air or gases enter at 62 in a horizontal direction. They enter the compartment 63, the bottom of which is formed by the inlet tube sheet 64 and the top of which is formed by the outlet tube sheet 65. The inlet tube sheet 64 has mounted therein a plurality of inlet tubes 66 in which is positioned a helix 67 that extends part way of the tube. The helix imparts a rotating and axial movement to the dust laden air or gases and the dust is thrown centrifugally outwardly against the periphery of the inside of the inlet tube 66. The dust thrown out continues downwardly between the periphery of the deflector plate 68 and the inside of the tube 66 into the hopper 71 whence the dust passes out through the opening 72, or when cone 69 is used dust passes from the tube 66 into cone 69 out of opening 70 into hopper 71 and out through opening 72. The dust free air passes centrally through the extended end 73 of the tube 74 and is discharged through the outlet pipe 75 that extends through the outlet tube sheet 65 whence the dust free air passes into the chamber 76 and thence through the opening 77. The chamber may discharge either vertically as shown, angularly, or horizontally as in Figure 1. The inlet tubes may be belled as at 66a to facilitate entry or they may be made straight as in Figure 1.

The casing 78 surrounding the several tubes 66 has its bottom closed by the hopper 71.

It will be understood that I desire to comprehend within this invention and the claims which follow hereinafter, such variations in construction and details as may be necessary to practice the principles of the invention.

Having thus fully described my invention, what I claim as new and desire to secure by Letters Patent, is:

1. In a dust collector, a main air chamber, a partition in said chamber dividing the same into an air inlet chamber and a clean air outlet chamber, a tube chamber, a dust chamber, a plurality of open ended dust tubes of substantially uniform diameter extending from the air inlet chamber to the dust chamber, a plurality of clean air conveying tubes suspended from said partition and extending into the interior of the first mentioned tubes by traversing the inlet chamber into the dust conveying tubes, and means in the first mentioned tubes between the interior of said tubes and the exterior of the clean air tubes for imparting helical motion to dust laden air passing therebetween, whereby the dust is thrown out centrifugally and thence passes out into the dust chamber while the clean air turns 180° and makes its exit through said clean air tubes, and substantially flat baffle plate means disposed within said dust tubes and spaced from the inlet end of said clean air tubes within said dust tubes to aid the formation of the vortex of the clean air and thus reduce the necessary length of the dust tubes.

2. In a multiple tube dust collector, an air inlet chamber, a dust collecting chamber, a plurality of inlet tubes of substantially uniform diameter disposed parallel with respect to one another and extending from said inlet chamber to said dust collecting chamber and opening directly thereinto for conveying dust laden air, a clean air tube positioned within each of said inlet tubes at least a portion of the length thereof and extending beyond the inlet end of said inlet tubes through which clean air passes in a reverse direction to the movement of dust laden air through said inlet tubes, means disposed between said inlet tubes and said clean air tubes for imparting a helical movement to the air and dust whereby the dust is thrown out centrifugally on the interior of said inlet tubes, means for receiving clean air from said clean air tubes, and a baffle positioned within each of said inlet tubes having the edge thereof positioned adjacent the wall of said inlet tube and disposed inwardly of the discharge end of said inlet tube.

HARRY O. DANZ.